(12) United States Patent
Abe (10) Patent No.: US 10,089,052 B2
(45) Date of Patent: Oct. 2, 2018

(54) TERMINAL DEVICE CAPABLE OF TRANSMITTING STATUS INFORMATION INDICATIVE OF USAGE STATUS OF CARTRIDGE MOUNTED IN FIRST PRINTER TO SECOND PRINTER

(71) Applicant: Brother Kogyo Kabushiki Kaisha, Nagoya-shi, Aichi-ken (JP)

(72) Inventor: Akiko Abe, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/626,625

(22) Filed: Jun. 19, 2017

(65) Prior Publication Data
US 2018/0074768 A1 Mar. 15, 2018

(30) Foreign Application Priority Data
Sep. 9, 2016 (JP) ................. 2016-176532

(51) Int. Cl.
*G06F 13/12* (2006.01)
*G06F 3/12* (2006.01)
*B41J 29/38* (2006.01)

(52) U.S. Cl.
CPC ............ *G06F 3/1293* (2013.01); *B41J 29/38* (2013.01); *G06F 3/121* (2013.01); *G06F 3/1261* (2013.01); *G06F 3/1285* (2013.01)

(58) Field of Classification Search
None
See application file for complete search history.

(56) References Cited

U.S. PATENT DOCUMENTS

| 2007/0097161 A1* | 5/2007 | Ejiri | B41J 2/17546 347/5 |
| 2014/0169803 A1* | 6/2014 | Lee | G03G 15/0863 399/12 |
| 2014/0376031 A1* | 12/2014 | Takamoto | G06F 3/1225 358/1.14 |

FOREIGN PATENT DOCUMENTS

JP 2007-062203 A 3/2007

* cited by examiner

*Primary Examiner* — Andrew H Lam
(74) *Attorney, Agent, or Firm* — Banner & Witcoff, Ltd.

(57) ABSTRACT

A terminal device includes a controller and is capable of communicating over a network with a first printer and a second printer. The first printer includes a first memory storing status information about usage status of a cartridge currently mounted in the first printer. The second printer includes a second memory. The controller is configured to perform: transmitting a request to the first printer, the request requesting to transmit the status information; in response to transmitting the request, receiving the status information; and in response to a specific condition being satisfied, transmitting the received status information to the second printer, the specific condition including a condition that the controller receives the status information. The status information transmitted to the second printer is stored in the second memory and used by the second printer after the cartridge is removed from the first printer and then mounted in the second printer.

10 Claims, 6 Drawing Sheets

TERMINAL DEVICE CAPABLE OF TRANSMITTING STATUS INFORMATION INDICATIVE OF USAGE STATUS OF CARTRIDGE MOUNTED IN FIRST PRINTER TO SECOND PRINTER

CROSS REFERENCE TO RELATED APPLICATION

This application claims priority from Japanese Patent Application No. 2016-176532 filed Sep. 9, 2016. The entire content of the priority application is incorporated herein by reference.

TECHNICAL FIELD

The present disclosure relates to a terminal device that is capable of communicating with printers over a network.

BACKGROUND

A printer in which a cartridge accommodating ink is detachably mountable is known in the art. The cartridge includes a memory for storing residual quantity information specifying the residual quantity of ink in the cartridge.

Under certain circumstances, such as when a printer malfunctions, the user may wish to remove the cartridge from the malfunctioning printer and mount the cartridge in another printer in order to continue using the cartridge. Since the cartridge in the conventional printer disclosed in the '203 Publication possesses a memory, the other printer could read the residual quantity information from the memory of the cartridge after the cartridge is mounted in the other printer to determine how much ink remains in the cartridge. However, when the cartridge that does not possess a memory for storing residual quantity information is used, the other printer cannot detect the residual quantity of ink in the cartridge. In this case, it is difficult for the other printer to perform proper printing operations with this cartridge.

SUMMARY

In view of the foregoing, it is an object of the present disclosure to provide a technique that allows the user to continue using a cartridge in another printer even when the cartridge does not possess a memory storing status information, such as residual quantity information, related to usage status of the cartridge.

In order to attain the above and other objects, according to one aspect, the disclosure provides a terminal device capable of communicating over a network with a first printer and a second printer different from the first printer. A first cartridge is mountable in the first printer. The first printer includes a first memory storing first status information. The first status information is related to a usage status of the first cartridge currently mounted in the first printer. The second printer includes a second memory. The terminal device includes a controller configured to perform: transmitting a first request to the first printer, the first request requesting the first printer to transmit the first status information to the terminal device; in response to transmitting the first request to the first printer, receiving the first status information from the first printer over the network; and in response to a specific condition being satisfied, transmitting the received first status information to the second printer, the specific condition including a condition that the controller receives the first status information from the first printer. The first status information transmitted to the second printer is stored in the second memory of the second printer. The first status information stored in the second memory is used by the second printer after the first cartridge is removed from the first printer and then mounted in the second printer.

According to another aspect, the disclosure provides a non-transitory computer readable storage medium storing a set of program instructions for a terminal device. The terminal device includes a controller and is capable of communicating over a network with a first printer and a second printer different from the first printer. A first printer is mountable in the first cartridge. The first printer includes a first memory storing first status information. The first status information is related to a usage status of the first cartridge currently mounted in the first printer. The second printer includes a second memory. The set of program instructions, when executed by the controller, causes the terminal device to perform: transmitting a first request to the first printer, the first request requesting the first printer to transmit the first status information to the terminal device; in response to transmitting the first request to the first printer, receiving the first status information from the first printer over the network; and in response to a specific condition being satisfied, transmitting the received first status information to the second printer, the specific condition including a condition that the controller receives the first status information from the first printer. The first status information transmitted to the second printer is stored in the second memory of the second printer. The first status information stored in the second memory is used by the second printer after the first cartridge is removed from the first printer and then mounted in the second printer.

BRIEF DESCRIPTION OF THE DRAWINGS

The particular features and advantages of the disclosure will become apparent from the following description taken in connection with the accompanying drawings, in which.

DETAILED DESCRIPTION

<Structure of a Communication System 2>

Figure 1:
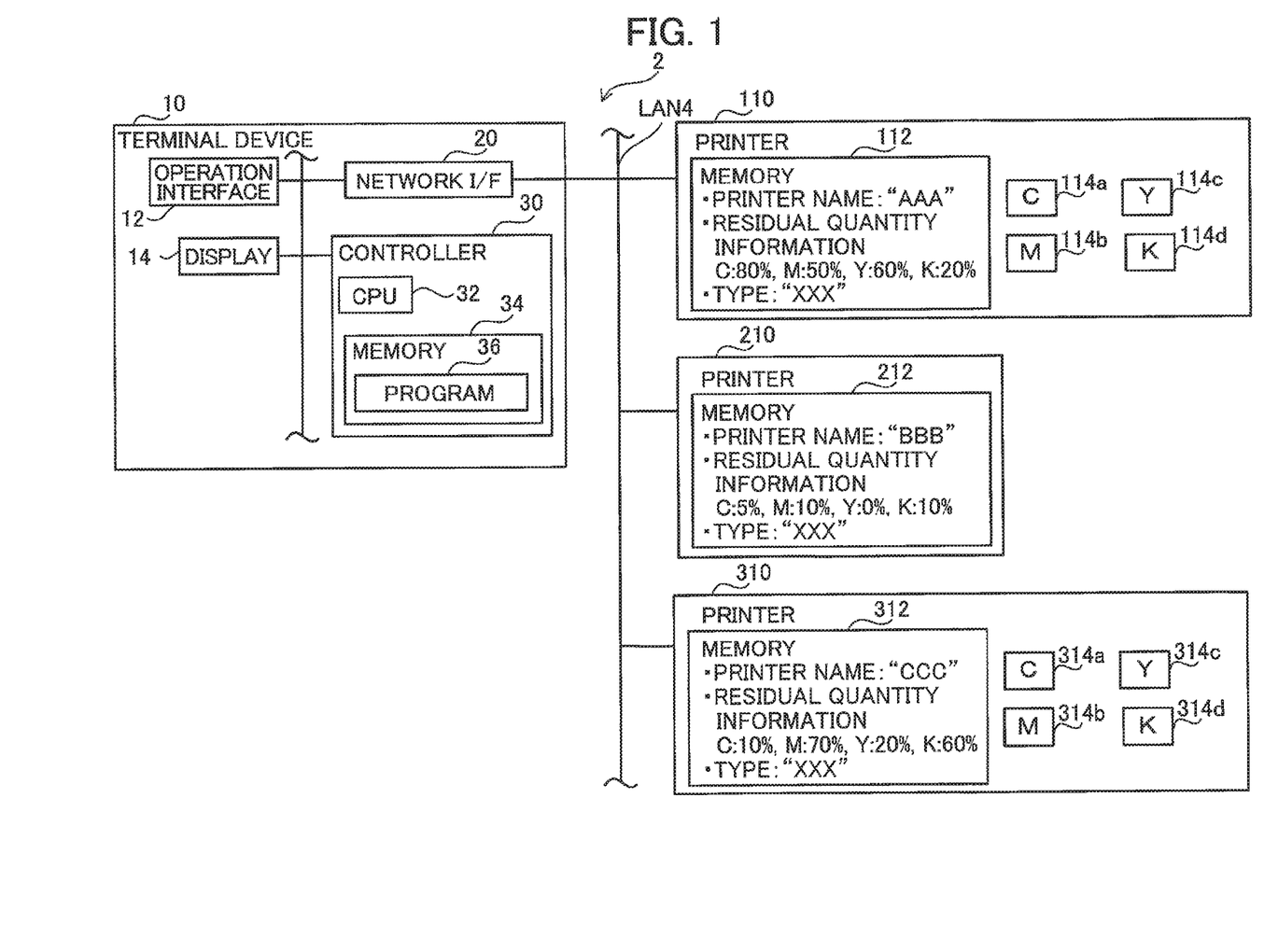
FIG. 1 is a block diagram illustrating structure of a communication system including a terminal device according to one embodiment.

Next, a communication system 2 including a terminal device 10 according to one embodiment will be described while referring to the accompanying drawings. As illustrated in FIG. 1, the communication system 2 further includes a plurality of printers 110, 210, and 310 in addition to the terminal device 10. The terminal device 10 and the printers 110, 210, and 310 are connected to a local area network 4 (hereinafter, simply referred to as "LAN 4") and can communicate with each other over the LAN 4. The LAN 4 may be wired or wireless. In the following description, the plurality of printers 110, 210, and 310 may also be generically referred to as printers. The LAN 4 is an example of the network.

<Structure of the Terminal Device 10>

The terminal device 10 may be a stationary terminal device, such as a desktop computer, or a portable terminal device, such as a notebook computer or a smartphone. The terminal device 10 includes an operation interface 12, a display 14, a network interface 20, and a controller 30.

The operation interface 12 includes a mouse and a keyboard. The user can input various commands into the terminal device 10 by operating the operation interface 12. The display 14 displays various types of information. The network interface 20 connects the terminal device 10 to the LAN 4.

The controller 30 includes a CPU 32 and a memory 34. The CPU 32 executes various processes according to programs 36 stored in the memory 34. The memory 34 is configured of ROM, RAM, and the like. The programs 36 include an operating system (OS) program, and a control program provided by the vendor of the printer 110 and the like. The control program may be installed on the terminal device 10 from media shipped together with the printer 110 or the like, for example, or may be installed on the terminal device 10 from a server provided on the Internet by the vendor of the printer 110 or the like. The control program is a program for transmitting residual quantity information corresponding to cartridges removed from one printer to another printer in which the cartridges are mounted. The memory 34 is an example of the non-transitory computer readable storage medium. The programs 36 is an example of the set of program instructions.

<Structure of the Printers>

The printers are peripheral devices (peripheral to the terminal device 10) that can implement a color print function. In the present embodiment, four cartridges corresponding to four colors (i.e., a cartridge accommodating cyan ink (C ink), a cartridge accommodating magenta ink (M ink), a cartridge accommodating yellow ink (Y ink), and a cartridge accommodating black ink (K ink)) can be mounted in each of the printers. More specifically, in the present embodiment cartridges 114a, 114b, 114c, and 144d for the CMYK colors are mounted in the printer 110 and cartridges 314a, 314b, 314c, and 314d for the CMYK colors are mounted in the printer 310, but no cartridge is mounted in the printer 210. Each of the cartridges can be mounted in and removed from the printers individually.

The printers 110, 210, and 310 are provided with memories 112, 212, and 312, respectively. The memories 112, 212, and 312 store the name of the printer (hereinafter called the "printer name"), residual quantity information for the cartridges, and cartridge type information specifying the types of cartridges that are mountable in the printer. Although no cartridges are currently mounted in the printer 210, the memory 212 stores residual quantity information for cartridges that were previously mounted in the printer 210. More specifically, the memory 112 stores the printer name of the printer 110, residual quantity information for the cartridges 114a, 114b, 114c, and 114d, and cartridge type information specifying the type of cartridge (the cartridge type) that are mountable in the printer 110. The memory 212 stores the printer name of the printer 210, residual quantity information for cartridges that were previously mounted in the printer 210, and cartridge type information specifying the type of cartridge that are mountable in the printer 210. The memory 312 stores the printer name of the printer 310, residual quantity information for the cartridges 314a, 314b, 114c, and 314d, and cartridge type information specifying the type of cartridge that are mountable in the printer 310.

Next, the residual quantity information will be described. Each of cartridges mounted in the printers is not provided with a memory for storing residual quantity information specifying the quantity of ink remaining therein (i.e., the residual ink quantity). The residual quantity information is stored in the memory of the printer. When a new cartridge is mounted in the printer, the printer detects, on the basis of a signal acquired from a sensor (not shown), that a new cartridge has been mounted. In such a case, the printer stores information indicating that the residual ink quantity is 100% in the memory as the residual quantity information corresponding to the new cartridge. In the present embodiment, the residual ink quantity is expressed as percentage to the quantity of ink accommodated in the new unused cartridge. The quantity of ink remaining in the cartridge is an example of the usage status.

When executing the print function thereafter, for each color, the printer calculates the quantity of ink consumed (i.e., the quantity of ejected ink droplets) and updates the residual quantity information by subtracting the consumed quantity calculated above from the current residual ink quantity indicated by the residual quantity information currently stored in the memory. The residual quantity information for each cartridge is maintained in the memory of the printer, even when the cartridges are removed from the printer. When a new cartridge is mounted in the printer, the residual quantity information corresponding to the new cartridge is updated by the printer so as to indicate 100% as the residual ink quantity of the new cartridge. However, when a used cartridge is mounted in the printer, the printer does not detect a new cartridge being mounted and, hence, does not update the residual quantity information for that cartridge. As will be described later in greater detail, when a used cartridge is mounted in a printer, the terminal device 10 in the present embodiment transmits residual quantity information for the used cartridge to the printer so that the printer can update residual quantity information stored in the memory of the printer.

<Control Process of the Terminal Device 10>

Next, a control process executed by the CPU 32 of the terminal device 10 according to the control program will be described with reference to FIG. 2. When a certain printer malfunctions, for example, the user may wish to remove the cartridges from the printer and mount them in a different printer in order to continue using the cartridges. In such a case, the user performs an operation on the operation interface 12 to launch the control program. At this time, the control process in FIG. 2 begins. In the following description, the printer from which the cartridges is removed will be called the "source printer," while the printer in which the cartridges are remounted will be called the "destination printer." Incidentally, the terminal device 10 executes communications via the network interface 20 during the control process. Hence, the expression "via the network interface 20" will be omitted from the description below.

In S10 the CPU 32 displays the printer names "AAA," "BBB," and "CCC" on the display 14. These printer names are the names corresponding to the printers 110, 210, and 310 that can communicate with the terminal device 10. After displaying the printer names, the CPU 32 monitors whether the user has selected a printer name as the source printer and a printer name as the destination printer from among the plurality of printers displayed on the display 14. When the user has selected printer names as the source and destination printers, in S10 the CPU 32 reaches a YES determination (S10: Yes) and advances to S12.

Figure 2:
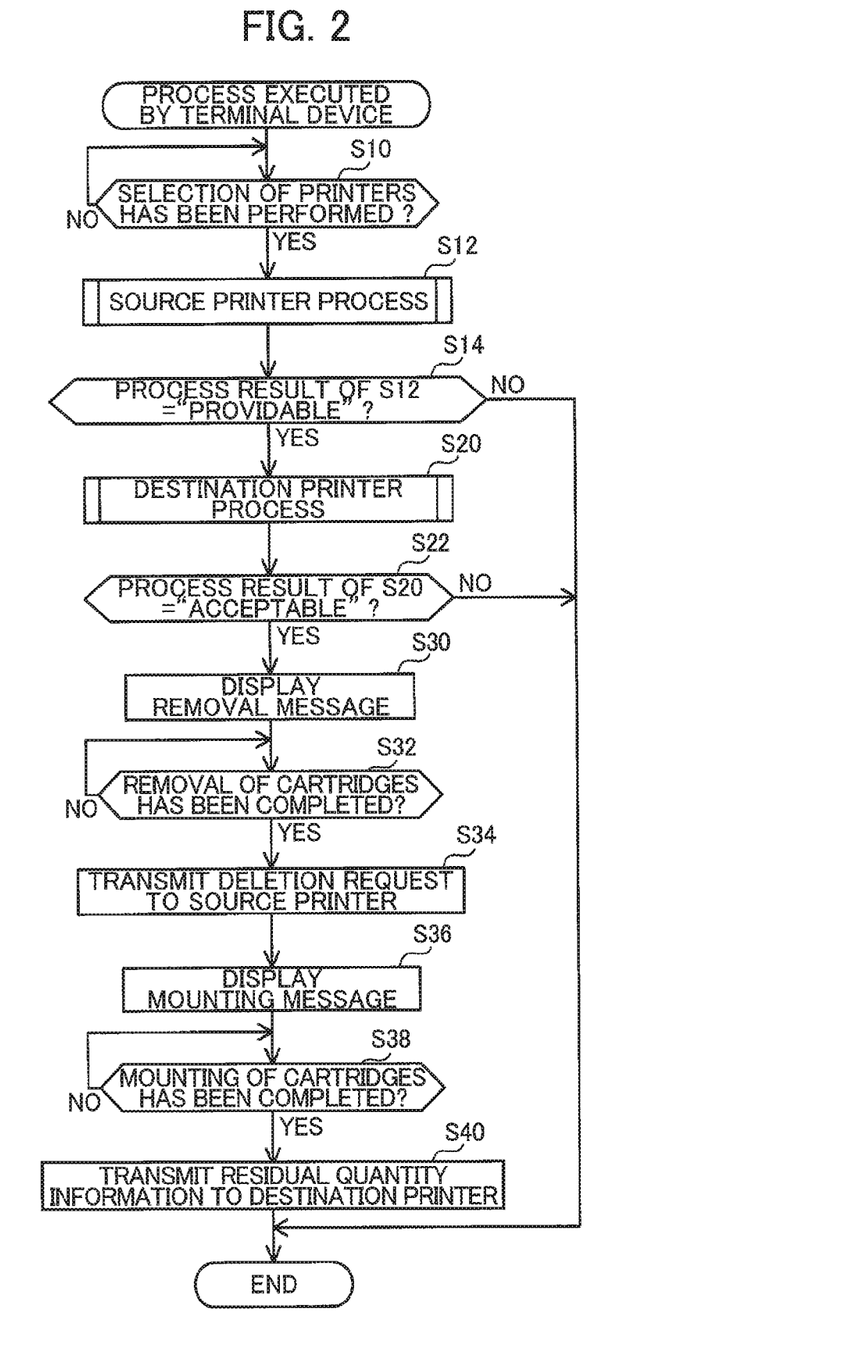
FIG. 2 is a flowchart illustrating steps in a control process performed by a controller of the terminal device according to the one embodiment.
Figure 3:
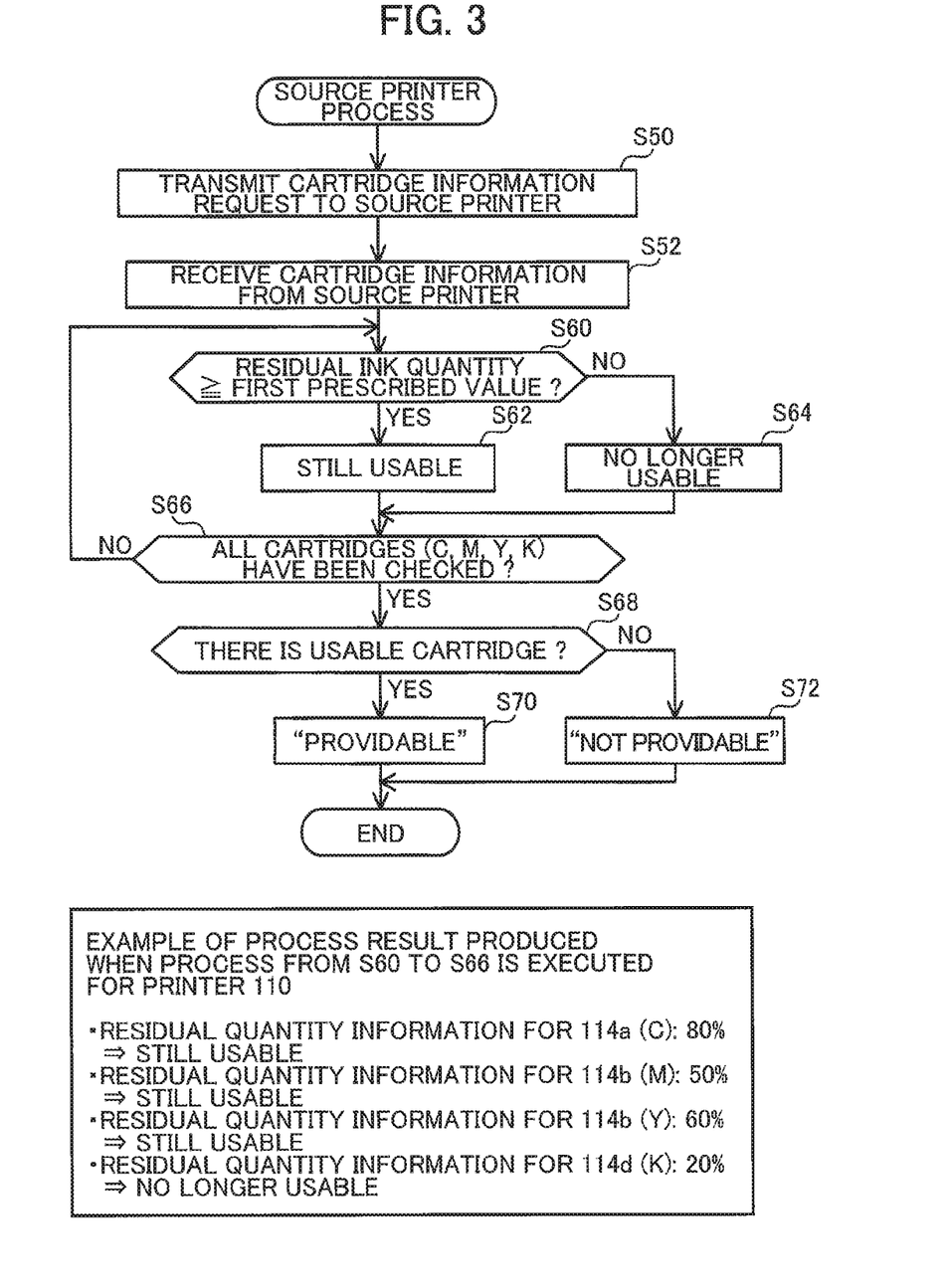
FIG. 3 is a flowchart illustrating steps in a source printer process included in the control process.

In S12 the CPU 32 executes a source printer process (see FIG. 3). In this process, the CPU 32 acquires from the source printer residual quantity information for the four cartridges currently mounted in the source printer and determines whether one or more of the four cartridges are still usable. Hereinafter, a cartridge that is still usable will be called "usable cartridge." When the CPU 32 determines that there are one or more usable cartridges in the four cartridges (i.e., when one or more usable cartridges are found in the four cartridges), the CPU 32 reaches a "providable" determination. However, when the CPU 32 determines that there are no usable cartridges in the four cartridges (i.e., when no usable cartridges are found in the four cartridges), the CPU 32 reaches a "not providable" determination.

In S14 the CPU 32 determines whether the result returned from the process in S12 is "providable." When the result of the process in S12 is "providable," in S14 the CPU 32 reaches a YES determination (S14: Yes) and advances to S20. On the other hand, when the result of the process in S12 is "not providable," in S14 the CPU 32 reaches a NO determination (S14: NO). In this case, the CPU 32 skips S20 and steps subsequent thereto and ends the control process of FIG. 2.

Figure 4:
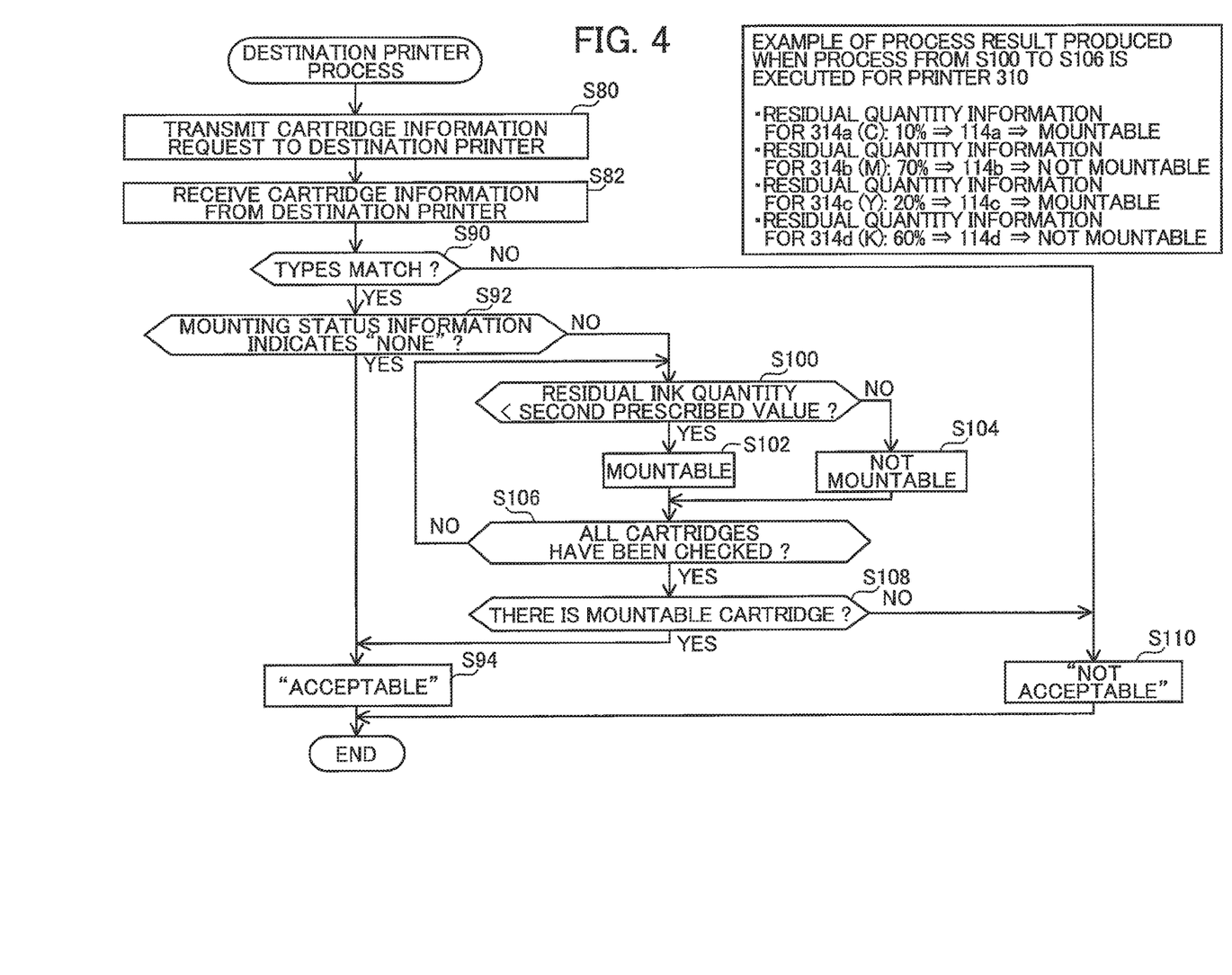
FIG. 4 is a flowchart illustrating steps in a destination printer process included in the control process.

In S20 the CPU 32 executes a destination printer process (see FIG. 4). In this process, the CPU 32 determines whether one or more of the one or more usable cartridges found in S12 can be mounted in the destination printer. Hereinafter, a usable cartridge that is determined to be mountable in the destination printer will be called "mountable cartridge." When there are one or more mountable cartridges in the one or more usable cartridges (i.e., when one or more mountable cartridges are found in the one or more usable cartridges), the CPU 32 reaches an "acceptable" determination. On the other hand, when there are no mountable cartridges in the one or more usable cartridges (i.e., when no mountable cartridges are found in the one or more usable cartridges), the CPU 32 reaches a "not acceptable" determination.

In S22 the CPU 32 determines whether the result returned from S20 is "acceptable." When the result of the process in S20 is "acceptable," in S22 the CPU 32 reaches a YES determination (S20: Yes) and advances to S30. On the other hand, when the result of the process in 20 is "not acceptable," in S22 the CPU 32 reaches a NO determination (S22: NO). In this case, the CPU 32 skips S30 and steps subsequent thereto and ends the process in FIG. 2.

In S30 the CPU 32 displays on the display 14 a message prompting the user to remove all of the cartridges currently mounted in the source printer from the source printer, and a message specifying the one or more mountable cartridges (i.e., the ink colors that are continuously usable).

In S32 the CPU 32 monitors whether all cartridges have been removed from the source printer. More specifically, the CPU 32 transmits a mounting status request to the source printer and receives mounting status information therefrom. The mounting status information specifies the colors of cartridges currently mounted in the printer. For example, when only two cartridges corresponding to the colors C and Y are currently mounted in the printer, the mounting status information received from the printer indicates "C, Y" (i.e., the colors C and Y). When no cartridges are currently mounted in the printer, the mounting status information indicates "none." When the mounting status information received from the source printer specifies "none," the CPU 32 determines that all cartridges have been removed (S32: YES) and advances to S34. However, when the mounting status information received from the source printer specifies one or more colors, the CPU 32 determines that removal of the cartridges has not been completed (S32: NO) and resends a mounting status request to the source printer. The mounting status information is an example of the detached information and also is an example of the attached information.

In S34 the CPU 32 transmits a deletion request to the source printer. The deletion request is a command requesting the source printer to reset (or delete) the residual quantity information for all cartridges stored in the memory of the source printer so that the reset residual quantity information will indicate initial values for all cartridges (i.e., "C: 0%, M: 0%, Y: 0%, K: 0%"). As a result of transmitting the deletion request to the source printer, all residual quantity information stored in the memory of the source printer can be reset (or deleted) so as to indicate the initial values. This action prevents a terminal device other than the terminal device 10 from acquiring the residual quantity information from the source printer and transmitting that residual quantity information to a printer other than the destination printer. In other words, by virtue of this action, when used cartridges other than the cartridges that were previously mounted in the source printer are mounted in a printer other than the destination printer, the printer other than the destination printer can be prevented from using residual quantity information indicating residual ink quantities different from the residual ink quantities of the used cartridges. The deletion request is an example of the second request.

In S36 the CPU 32 displays on the display 14 a message prompting the user to mount the one or more mountable cartridges among all of the cartridges (i.e., the four cartridges) removed from the source printer in the destination printer. Prompted by this message, the user then mounts the one or more mountable cartridges in the destination printer.

In S38 the CPU 32 monitors whether all of the one or more mountable cartridges have been mounted in the destination printer. Specifically, the CPU 32 transmits a mounting status request to the destination printer and receives mounting status information from the destination printer in response. When the mounting status information received from the destination printer specifies all of the one or more colors corresponding to the one or more mountable cartridges, the CPU 32 determines that all mountable cartridges have been mounted (S38: YES) and advances to S40. However, when the received mounting status information omits one or more of the colors corresponding to the one or more mountable cartridges, the CPU 32 determines that mounting of all mountable cartridges has not been completed (S38: NO), and resends a mounting status request to the destination printer.

In S40 the CPU 32 transmits residual quantity information for the one or more mountable cartridges to the destination printer. This residual quantity information is extracted from the residual quantity information for the four cartridges acquired in S12. This action can make the destination printer update the residual quantity information stored in the memory of the destination printer.

<Source Printer Process>

Next, steps in the source printer process executed in S12 of FIG. 2 will be described with reference to FIG. 3. In S50 of FIG. 3, the CPU 32 transmits a cartridge information request to the source printer. The cartridge information request is a command requesting a recipient printer to transmit cartridge information for the recipient printer to the terminal device 10. That is, the cartridge information request transmitted to the source printer in S50 requests the source printer to transmit cartridge information for the source printer to the terminal device 10. The cartridge information includes residual quantity information, cartridge type information, and mounting status information. In S52 the CPU 32 receives cartridge information from the source printer in response to transmitting the request in S50. Hereinafter, the cartridge information received from the source printer in S52 will be called "source cartridge information." Further, hereinafter, the residual quantity information, the cartridge type information, and the mounting status information that are included in the source cartridge information will be called "source residual quantity information," "source cartridge type information," and "source mounting status information," respectively. The cartridge information request is an example of the first request.

In S60 the CPU 32 selects one of the four ink colors (C, for example). Next, the CPU 32 determines whether the residual ink quantity indicated by the source residual quantity information for the cartridge corresponding to the selected color is greater than or equal to a first prescribed value (40%, for example). When the source mounting status information indicates the selected color and the residual ink quantity indicated by the source residual quantity information for the cartridge corresponding to the selected color is greater than or equal to the first prescribed value, in S60 the CPU 32 reaches a YES determination (S60: YES). Subsequently, in S62 the CPU 32 determines that the cartridge corresponding to the selected color is still usable. On the other hand, when the source mounting status information does not specify the selected color (i.e., when a cartridge corresponding to the selected color is not mounted in the source printer), in S60 the CPU 32 reaches a NO determination (S60: NO). Then, in S64 the CPU 32 determines that the cartridge corresponding to the selected color is no longer usable. Also when the source mounting status information indicates the selected color but the residual ink quantity indicated by source residual quantity information for the cartridge corresponding to the selected color is lower than the first prescribed value, in S60 the CPU 32 reaches a NO determination (S60: NO). Then, in S64 the CPU 32 determines that the cartridge corresponding to the selected color is no longer usable. Mounting a cartridge having less ink than the first prescribed value in the destination printer might make the user feel inconvenient since there is a high probability that the cartridge would need to be replaced soon in the destination printer. Therefore, the method of the present embodiment can reduce such inconvenience in the user by discouraging the user from mounting a cartridge with less ink than the first prescribed value (the cartridges for which a NO determination was reached in S60) in the destination printer. After completing step S62 or S64, the CPU 32 proceeds to S66. The first prescribed value is an example of the prescribed value.

In S66 the CPU 32 determines whether the process from S60 to S64 has been executed for all cartridges corresponding to the four colors. When the CPU 32 determines that the process from S60 to S64 has not been executed for all cartridges corresponding to the four colors (in other words, when the CPU 32 determines that there remain unprocessed cartridges) (S66: NO), the CPU 32 returns to S60 and selects a color for which the process has not yet been executed. When the CPU 32 determines that the process has been executed for all cartridges (S66: YES), the CPU 32 advances to S68. The bottom region of FIG. 3 illustrates an example of process results produced when the source printer is the printer 110. As illustrated in FIG. 3, the CPU 32 determines that the cartridges 114*a*, 114*b*, and 114*c* corresponding to ink colors C, M, and Y are still usable, but determines that the cartridge 114*d* for K is no longer usable.

In S68 the CPU 32 determines whether there are one or more cartridges that are determined to be still usable (i.e., whether there are one or more usable cartridges). When there are one or more usable cartridges, in S68 the CPU 32 reaches a YES determination (S68: YES). Subsequently, in S70 the CPU 32 reaches a "providable" determination as the process result of FIG. 3. As a consequence, the CPU 32 reaches a YES determination in S14 of FIG. 2 and advances to S20. However, when there are no usable cartridges, in S68 the CPU 32 reached a NO determination (S68: NO). Then, in S72 the CPU 32 reaches a "not providable" determination as the process result of FIG. 3. Accordingly, the CPU 32 reaches a NO determination in S14 of FIG. 2 and skips S20 and steps subsequent thereto in FIG. 2. After completing step S70 or S72, the CPU 32 ends the process of FIG. 3.

<Destination Printer Process>

Next, steps in the destination printer process executed in S20 of FIG. 2 will be described with reference to FIG. 4. In S80 of FIG. 4, the CPU 32 transmits a cartridge information request to the destination printer. In S82 the CPU 32 receives cartridge information from the destination printer in response to transmitting the request in S80. Hereinafter, the cartridge information received from the destination printer in S82 will be called the "destination cartridge information." Further, hereinafter, the residual quantity information, the cartridge type information, and the mounting status information that are included in the destination cartridge information will be called "destination residual quantity information," "destination cartridge type information," and "destination mounting status information," respectively.

In S90 the CPU 32 determines whether the cartridge type specified by the source cartridge type information received in S52 of FIG. 3 matches the cartridge type specified by the destination cartridge type information received in S82. When the former cartridge type does not match the latter cartridge type, in S90 the CPU 32 reaches a NO determination (S90: NO). Subsequently, in S110 the CPU 32 reaches a "not acceptable" determination as the process result of FIG. 4. However, when the former cartridge type matches the latter cartridge type (S90: YES), the CPU 32 advances to S92.

In S92 the CPU 32 determines whether the destination mounting status information indicates "none." When the destination mounting status information indicates "none," in S92 the CPU 32 reaches a YES determination (S92: YES). Then, in S94 the CPU 32 reaches an "acceptable" determination as the process result of FIG. 4. In this case, all of the one or more usable cartridges identified in the process of FIG. 3 are treated as mountable cartridges. Subsequently, the CPU 32 reaches a YES determination in S22 of FIG. 2 and continues the process from S30. However, when the destination mounting status information does not indicate "none," i.e., when the destination mounting status information specifies one or more colors, in S92 the CPU 32 reaches a NO determination (S92: NO) and then proceeds to S100.

In S100 the CPU 32 selects one from among the one or more colors corresponding to the one or more usable cartridges identified in the process of FIG. 3. Next, the CPU 32 determines whether the residual ink quantity indicated by the destination residual quantity information for the cartridge corresponding to the selected color is lower than a second prescribed value (40%, for example). When the destination mounting status information does not indicate the selected color (i.e., when a cartridge corresponding to the selected color is not mounted in the destination printer), in S100 the CPU 32 reaches a YES determination (S100: Yes) regardless of the residual ink quantity indicated by the destination residual quantity information for the cartridge corresponding to the selected color. Then, in S102 the CPU 32 determines that the usable cartridge corresponding to the selected color is mountable in the destination printer.

Also when the destination mounting status information specifies the selected color and the residual ink quantity indicated by the destination residual quantity information for the cartridge corresponding the selected color is lower than the second prescribed value, in S100 the CPU 32 reaches a YES determination (S100: YES). Subsequently, in S102 the CPU 32 determines that the usable cartridge corresponding to the selected color is mountable in the destination printer.

On the other hand, when the destination mounting status information specifies the selected color and the residual ink quantity indicated by the destination residual quantity information for the cartridge corresponding to the selected color is greater than or equal to the second prescribed value, the CPU 32 reaches a NO determination (S100: NO). Subsequently, in S104 the CPU 32 determines that the usable cartridge corresponding to the selected color is not mountable in the destination printer. In the latter case, a cartridge corresponding to the selected color is currently mounted in the destination printer, and a large quantity of ink remains in the cartridge. Hence, it is highly likely that the usable cartridge runs out of ink more quickly than the currently mounted cartridge if the user mounts the usable cartridge in place of the currently mounted cartridge. To prevent such an occurrence, in S104 the CPU 32 determines that the usable cartridge is not mountable in the destination printer. After completing step S102 or S104, the CPU 32 advances to S106.

In S106 the CPU 32 determines whether the process from S100 to S104 has been completed for all of the one or more usable cartridges. When the process from S100 to S104 has not yet been executed for all usable cartridges (i.e., when there remain unprocessed usable cartridges) (S106: NO), the CPU 32 returns to S100 and selects a color corresponding to the usable cartridge that has not yet been processed. On the other hand, when the CPU 32 determines that the process has been completed for all usable cartridges (S106: YES), the CPU 32 advances to S108.

The upper-right region of FIG. 4 illustrates an example of process results produced when the destination printer is the printer 310. In this example, the CPU 32 determines that the usable cartridges corresponding to C and Y (i.e., the cartridges 114a and 114c) are mountable in the destination printer (S100: YES, S102). The CPU 32 also determines that the usable cartridge corresponding to M (i.e., the cartridge 114b) is not mountable in the destination printer (S100: NO, S104). Incidentally, the CPU 32 determines the cartridge that has been determined to be no longer usable in S64 of FIG. 3 is not mountable in the destination printer. In the example illustrated in FIGS. 3 and 4, the CPU 32 determines that the cartridge 114d for K is not mountable in the destination printer.

In S108 the CPU 32 determines whether there are one or more usable cartridge determined to be mountable in the destination printer (i.e., whether there are one or more mountable cartridge in the one or more usable cartridges). When there are one or more mountable cartridges, in S108 the CPU 32 reaches a YES determination (S108: YES). Then, in S94 the CPU 32 reaches an "acceptable" determination as the process result of FIG. 4. Consequently, in S22 of FIG. 2 the CPU 32 reaches a YES determination and continues the process from S30. However, when there are no mountable cartridges, in S108 the CPU reaches a NO determination (S108: NO). Subsequently, in S110 the CPU 32 reaches a "not acceptable" determination as the process result of FIG. 4. In this case, the CPU 32 reaches a NO determination in S22 and skips S30 and steps subsequent thereto in FIG. 2. After completing step S94 or S110, the CPU 32 ends the process of FIG. 4.

<Specific Cases A and B>

Next, specific cases A and B resulting from the control process in FIGS. 2 through 4 will be described with reference to FIGS. 5 and 6.

Figure 5:
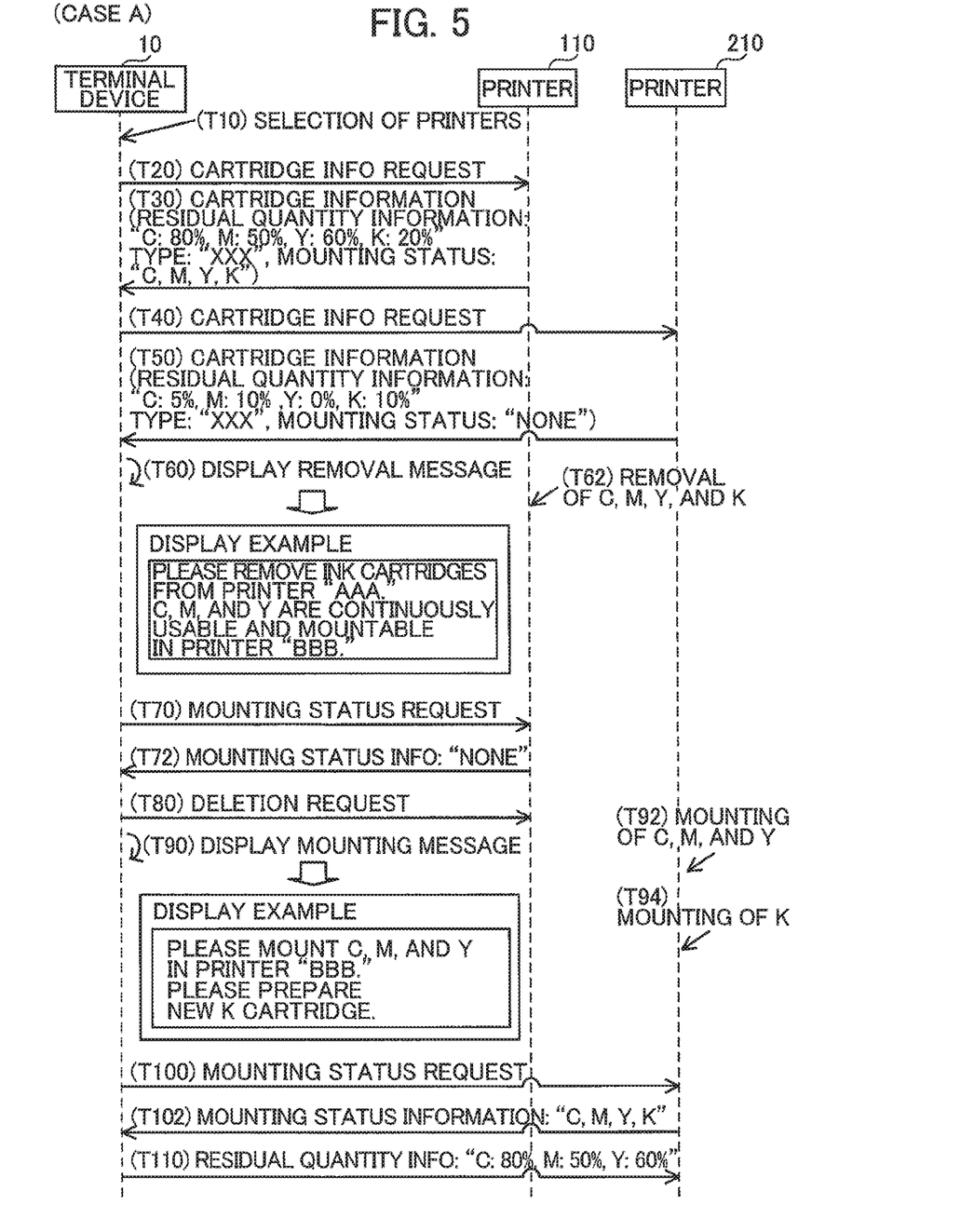
FIG. 5 is a sequence diagram illustrating a specific case A resulting from the control process.

<Case a of FIG. 5>

In T10 of FIG. 5, the terminal device 10 receives selections for the printer 110 and the printer 210 as the source printer and the destination printer, respectively (S10: YES in FIG. 2).

In T20 the terminal device 10 transmits a cartridge information request to the printer 110 (S50 of FIG. 3) and in T30 receives cartridge information from the printer 110 (S52). The cartridge information received from the printer 110 includes the residual quantity information for the cartridges 114a, 114b, 114c, and 144d; the cartridge type information indicating "XXX"; and the mounting status information indicating "C, M, Y, K." Next, the terminal device 10 determines that the three cartridges 114a, 114b, and 114c corresponding to C, M, and Y are still usable (S60: YES, S62) and that the cartridge 114d corresponding to K is no longer usable (S60: NO, S64).

In T40 the terminal device 10 transmits a cartridge information request to the printer 210 (S80 of FIG. 4) and in T50 receives cartridge information from the printer 210 (S82). The cartridge information received from the printer 210 includes residual quantity information, the cartridge type information indicating "XXX", and the mounting status information indicating "none." This residual quantity information specifies residual ink quantities of cartridges that were previously mounted in the printer 210. Here, the terminal device 10 determines that the cartridge type "XXX" indicated by the cartridge type information for the printer 110 matches the cartridge type "XXX" indicated by the cartridge type information for the printer 210 (S90: YES). Subsequently, the terminal device 10 determines that the three cartridges 114a, 114b, and 114c corresponding to C, M, and Y are mountable since the mounting status information for the printer 210 indicates "none" (S92: YES, S94).

In T60 the terminal device 10 displays on the display 14 a message prompting the user to remove all four cartridges 114a, 114b, 114c, and 144d from the printer 110, and a message notifying the user that the three cartridges 114a, 114b, and 114c corresponding to C, M, and Y are continuously usable and mountable (S30 of FIG. 2). When prompted by this message, in T62 the user removes the four cartridges 114a, 114b, 114c, and 144d from the printer 110.

In T70 the terminal device 10 transmits a mounting status request to the printer 110 (S32 of FIG. 3) and in T72 receives the mounting status information indicating "none" from the printer 110 in response. Accordingly, the terminal device 10 determines that all cartridges 114a, 114b, 114c, and 144d have been removed from the printer 110 (S32: YES). In T80 the terminal device 10 transmits a deletion request to the printer 110 (S34). As a result, the residual quantity information stored in the memory 112 is updated by the printer 110 to indicate "C: 0%, M: 0%, Y: 0%, K: 0%."

In T90 the terminal device 10 displays on the display 14 a message prompting the user to mount the three used cartridges 114a, 114b, and 114c corresponding to C, M, and Y in the printer 210, and a message prompting the user to mount a new cartridge corresponding to K in the printer 210 in place of the cartridge 114*d* corresponding to K (S36 of FIG. 2). When prompted by these messages, the user mounts the used cartridges 114*a*, 114*b*, and 114*c* in the printer 210 in T92 and mounts a new cartridge for K in the printer 210 in T94.

When the new cartridge for K is mounted, the printer 210 detects that a new cartridge has been mounted. At this time, the residual quantity information for K ink is updated by the printer 210 to indicate "100%." However, since the cartridges 114*a*, 114*b*, and 114*c* for C, M, and Y are used cartridges, the printer 210 does not update the residual quantity information for C, M, and Y even though the cartridges 114*a*, 114*b*, and 114*c* have been mounted in the printer 210. Consequently, the residual quantity information stored in the printer 210 at this time indicates "C: 5%, M: 10%, Y: 0%, K: 100%."

In T100 the terminal device 10 transmits a mounting status request to the printer 210 (S38 of FIG. 2) and in T102 receives from the printer 210 the mounting status information indicating "C, M, Y, K." Accordingly, the terminal device 10 determines that all of the used cartridges 114*a*, 114*b*, and 114*c*, and the new cartridge for K have been mounted in the printer 210 (S38: YES). In T110 the terminal device 10 transmits the residual quantity information for the three cartridges 114*a*, 114*b*, and 114*c* indicating "C: 80%, M: 50%, Y: 60%" to the printer 210 (S40). In other words, in T110 the terminal device 10 transmits the residual quantity information for the cartridge 114*a* indicating "80%", the residual quantity information for the cartridge 114*b* indicating "50%", and the residual quantity information for the cartridge 114*c* indicating "60%" to the printer 210 (S40). As a result, the residual quantity information stored in the memory 212 is updated by the printer 210 to indicate "C: 80%, M: 50%, Y: 60%, K: 100%." Hence, the residual ink quantities indicated by the residual quantity information stored in the memory 212 now matches the actual residual ink quantities of the three used cartridges 114*a* (C ink), 114*b* (M ink), and 114*c* (Y ink), and the new cartridge (K ink) that are currently mounted in the printer 210. Accordingly, the printer 210 can execute proper printing operations while continuing to use the used cartridges 114*a*, 114*b*, and 114*c*.

In the above-described Case A, the printer 110 is an example of the first printer and the printer 210 is an example of the second printer. The memory 112 is an example of the first memory, and the memory 212 is an example of the second memory. The cartridge 114*a* is an example of the first cartridge, and the cartridge 114*d* is an example of the second cartridge. The C ink accommodated in the cartridge 114*a* is an example of the first printing material, and the K ink accommodated in the cartridge 114*d* is an example of the second printing material. The color of the C ink, i.e., the cyan color is an example of the first color, and the color of the K ink, i.e., the black color is an example of the second color. The residual quantity of the cartridge 114*a* (C ink), i.e., 80% is an example of the first residual quantity, and the residual quantity of the cartridge 114*d* (K ink), i.e., 20% is an example of the second residual quantity. The residual quantity information for the cartridge 114*a* (C ink) is example of the first status information, and the residual quantity information for the cartridge 114*d* (K ink) is example of the second status information. The cartridge information received from the printer 110 is an example of the first type information, and the cartridge information received from the printer 210 is an example of the second type information. The cartridge type "XXX" is an example of the first cartridge type and also is an example of the second cartridge type.

Figure 6:
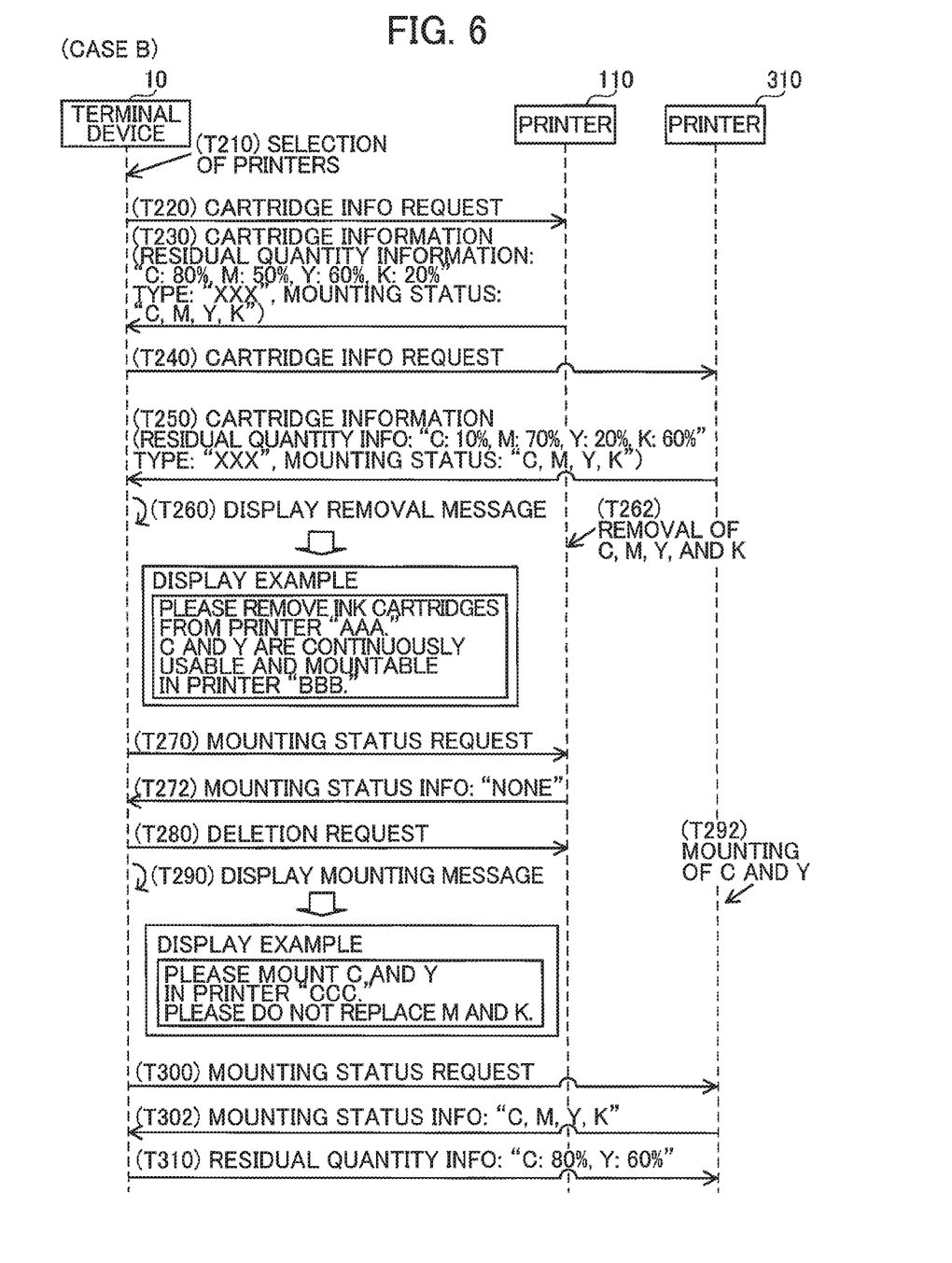
FIG. 6 is a sequence diagram illustrating a specific case B resulting from the control process.

<Case B of FIG. 6>

T210-T240 of FIG. 6 are identical to T10-T40 of FIG. 5, except that the destination printer in Case B is the printer 310. In T250 the terminal device 10 receives cartridge information from the printer 310. The cartridge information received from the printer 310 includes the residual quantity information for the cartridges 314*a*, 314*b*, 314*c*, and 314*d*, the cartridge type information indicating "XXX", and the mounting status information indicating "C, M, Y, K" (S82 of FIG. 4). Hence, the terminal device 10 determines that the cartridge type "XXX" indicated by the cartridge type information for the printer 110 matches the cartridge type "XXX" indicated by the cartridge type information for the printer 310 (S90: YES) and determines that the mounting status information for the printer 310 does not indicate "none" (S92: NO). Subsequently, the terminal device 10 determines that the residual ink quantities indicated by the residual quantity information for the cartridges 314*a* and 314*c* corresponding to two (i.e., CY) of the three ink colors (i.e., CMY) corresponding to the usable cartridges 114*a*, 114*b*, and 114*c* are lower than the second prescribed value (S100: Yes, S102). Further, the terminal device 10 determines that the residual ink quantity indicated by the residual quantity information for the cartridge 314*b* corresponding to one (i.e., M) of the above three ink colors (i.e., CMY) is greater than or equal to the second prescribed value (S100: NO, S104).

T260-T280 are equivalent to T60-T80 of FIG. 5, except that the two cartridges 114*a* and 114*c* for C and Y are mountable and continuously used. In T290 the terminal device 10 displays on the display 14 a message prompting the user to mount the two cartridges 114*a* and 114*c* for C and Y in the printer 310 (S36 of FIG. 2). Further, since the residual ink quantities indicated by the residual quantity information for the cartridges 314*b* and 314*d* (corresponding to M and K) are greater than the second prescribed value, the terminal device 10 displays on the display 14 a message notifying the user that cartridges 314*b* and 314*d* need not be replaced. T292-T310 are substantially identical to T90-T110 of FIG. 5, except that the cartridges 114*a* and 114*c* for C and Y are mountable and continuously used.

In the above-described Case B, the printer 110 is an example of the first printer and the printer 310 is an example of the second printer. The memory 112 is an example of the first memory, and the memory 312 is an example of the second memory. The cartridge 114*a* is an example of the first cartridge, and the cartridge 114*d* is an example of the second cartridge. The C ink accommodated in the cartridge 114*a* is an example of the first printing material, and the K ink accommodated in the cartridge 114*d* is an example of the second printing material. The color of the C ink, i.e., the cyan color is an example of the first color, and the color of the K ink, i.e., the black color is an example of the second color. The residual quantity of the cartridge 114*a* (C ink), i.e., 80% is an example of the first residual quantity, and the residual quantity of the cartridge 114*d* (K ink), i.e., 20% is an example of the second residual quantity. The residual quantity information for the cartridge 114*a* (C ink) is example of the first status information, and the residual quantity information for the cartridge 114*d* (K ink) is example of the second status information. The cartridge information received from the printer 110 is an example of the first type information, and the cartridge information received from the printer 310 is an example of the second type information. The cartridge type "XXX" is an example of the first cartridge type and also is an example of the second cartridge type.

<Effects of the Embodiment>

When the printer 110 malfunctions, for example, in some cases the user of the printer 110 may wish to remove the cartridge 114a from the printer 110 and mount the cartridge 114a in the printer 210 in order to continue using the cartridge 114a. However, when the cartridge 114a does not possess memory for storing residual quantity information for the cartridge 114a, the printer 210 cannot acquire residual quantity information for the cartridge 114a from the same. In this case, the printer 210 cannot execute proper printing operations using the cartridge 114a. Therefore, in the present embodiment the terminal device 10 receives residual quantity information for the cartridge 114a from the printer 110 and transmits this information to the printer 210 (S40 of FIG. 2). Through this process, the printer 210 can acquire the residual quantity information for the cartridge 114a. As a result, the printer 210 can execute proper printing operations while continuing to use the cartridge 114a.

While the description has been made in detail with reference to specific embodiment, it would be apparent to those skilled in the art that various changes and modifications may be made thereto.

<Variation 1>

The cartridges 114a, 114b, 114c, 114d, 314a, 314b, 314c, and 314d may be toner cartridges or drum cartridges. When these cartridges are toner cartridges, the terminal device 10 may receive residual quantity information for the toner cartridges mounted in the source printer from the same and may transmit this residual quantity information to the destination printer. When these cartridges are drum cartridges, the terminal device 10 may receive the numbers of times of use (e.g., the number of printed pages) of the drum cartridges mounted in the source printer from the same and may transmit the received numbers of times of use to the destination printer. The toner is an example of the first printing material and also is an example of the second printing material. The number of times of use is an example of the usage status. Information indicating the number of times of use is an example of the first status information and also is an example of the second status information.

<Variation 2>

The printer 110 may also be configured to delete the residual quantity information for cartridges when the cartridges are removed from the printer 110, for example. In this case, step S34 may be omitted from the process in FIG. 2.

<Variation 3>

Step S32 may also be omitted from the process in FIG. 2. Further, step S38 may be omitted from the process in FIG. 2.

<Variation 4>

When the terminal device 10 is configured to allow the user to select only printers whose cartridge type matches the cartridge type of the printer 110 as the destination printer in S10 of FIG. 2, step S90 may be omitted from the process in FIG. 4

<Variation 5>

The printers 110, 210, and 310 may be configured to implement only a monochrome print function and not to implement a color print function. That is, the printers 110, 210, and 310 may only allow a single cartridge for K to be mounted therein. In this case, the terminal device 10 may acquire residual quantity information for the single K cartridge from the source printer and may transmit the residual quantity information for this cartridge to the destination printer.

<Variation 6>

In the present embodiment and the variations thereof described above, the processes in FIGS. 2 through 4 are implemented by the CPU 32 executing the programs 36 (i.e., software). However, at least part of processes in FIGS. 2 through 4 may be implemented in hardware, such as logic circuits.

The technical elements described in the present specification or drawings exhibit technical utility either independently or in various combinations and shall not be limited to the combinations set forth in the claims at the time of filing. Further, the technology illustrated in the specification or drawings achieves multiple objects at the same time, and achieving one of the objects itself demonstrates technical utility.

What is claimed is:

1. A terminal device capable of communicating over a network with:
   a first printer in which a first cartridge is mountable, the first printer including a first memory storing first-cartridge status information, the first-cartridge status information being related to a usage status of the first cartridge currently mounted in the first printer; and
   a second printer different from the first printer, the second printer including a second memory,
   the terminal device comprising a controller configured to perform:
      transmitting a first request to the first printer, the first request requesting the first printer to transmit the first-cartridge status information to the terminal device;
      in response to transmitting the first request to the first printer, receiving the first-cartridge status information from the first printer over the network; and
      in response to a specific condition being satisfied, transmitting the received first-cartridge status information to the second printer, the specific condition including a condition that the controller receives the first-cartridge status information from the first printer,
   wherein the first-cartridge status information transmitted to the second printer is stored in the second memory of the second printer, and
   wherein, after the first cartridge is removed from the first printer and mounted in the second printer, the first-cartridge status information stored in the second memory is used by the second printer.

2. The terminal device according to claim 1, wherein the controller is further configured to perform:
   in response to receiving the first-cartridge status information from the first printer, transmitting a second request to the first printer, the second request requesting the first printer to delete the first-cartridge status information stored in the first memory of the first printer.

3. The terminal device according to claim 1, wherein the controller is further configured to perform:
   receiving, from the first printer, detached information indicating that the first cartridge is not mounted in the first printer,
   wherein the specific condition further includes a condition that the controller receives the detached information from the first printer.

4. The terminal device according to claim 1, wherein the controller is further configured to perform:

receiving, from the second printer, attached information indicating that the first cartridge is currently mounted in the second printer, and wherein the specific condition further includes a condition that the controller receives the attached information from the second printer.

5. The terminal device according to claim 1, wherein the controller is further configured to perform:

receiving a first type information from the first printer, the first type information specifying a first cartridge type, the first cartridge type being a cartridge type of the first cartridge;

receiving a second type information from the second printer, the second type information specifying a second cartridge type, the second cartridge type being a cartridge type of a cartridge mountable in the second printer; and determining whether or not the first cartridge type specified by the received first type information matches the second cartridge type specified by the received second type information, wherein the specific condition includes a condition that the controller determines that the first cartridge type specified by the received first type information matches the second cartridge type specified by the received second type information, and wherein the transmitting the received first-cartridge status information is not performed in response to determining that the first cartridge type specified by the received first type information does not match the second cartridge type specified by the received second type information.

6. The terminal device according to claim 1, wherein the first cartridge accommodates a first printing material having a first color, wherein a second cartridge is mountable in the first printer together with the first cartridge, the second cartridge accommodating a second printing material having a second color different from the first color, wherein the first memory further stores second-cartridge status information, the second-cartridge status information being related to a usage status of the second cartridge currently mounted in the first printer, wherein the first request further requests the first printer to transmit the second-cartridge status information to the terminal device, wherein the controller is further configured to perform:

in response to transmitting the first request to the first printer, receiving the second-cartridge status information from the first printer; and in response to a second specific condition being satisfied, transmitting the received second-cartridge status information to the second printer, the second specific condition including a condition that the controller receives the second-cartridge status information from the first printer, wherein the second-cartridge status information transmitted to the second printer is stored in the second memory, and wherein the second-cartridge status information stored in the second memory is used by the second printer when the second cartridge is removed from the first printer and then mounted in the second printer.

7. The terminal device according to claim 6, wherein the first-cartridge status information indicates a first residual quantity, the first residual quantity being a quantity of the first printing material remaining in the first cartridge, and wherein the second-cartridge status information indicates a second residual quantity, the second residual quantity being a quantity of the second printing material remaining in the second cartridge.

8. The terminal device according to claim 7, wherein the controller is further configured to perform:

determining whether or not the first residual quantity indicated by the received first-cartridge status information is greater than or equal to a prescribed value; and determining whether or not the second residual quantity indicated by the received second-cartridge status information is greater than or equal to the prescribed value, wherein the specific condition further includes a condition that the controller determines that the first residual quantity indicated by the received first-cartridge status information is greater than or equal to the prescribed value, wherein the transmitting the received first-cartridge status information is not performed in response to determining that the first residual quantity indicated by the received first-cartridge status information is not greater than or equal to the prescribed value, wherein the second specific condition further includes a condition that the controller determines that the second residual quantity indicated by the received second-cartridge status information is greater than or equal to the prescribed value, and wherein the transmitting the received second-cartridge status information is not performed in response to determining that the second residual quantity indicated by the received second-cartridge status information is not greater than or equal to the prescribed value.

9. The terminal device according to claim 7, further comprising a display, wherein the controller is further configured to perform:

determining whether or not the first residual quantity indicated by the received first-cartridge status information is greater than or equal to a prescribed value;

determining whether or not the second residual quantity indicated by the received second-cartridge status information is greater than or equal to the prescribed value; and in response to determining that the first residual quantity indicated by the received first-cartridge status information is greater than or equal to the prescribed value and determining that the second residual quantity indicated by the received second-cartridge status information is not greater than nor equal to the prescribed value, displaying on the display a message prompting to mount the first cartridge in the second printer without displaying on the display a message prompting to mount the second cartridge in the second printer.

10. A non-transitory computer readable storage medium storing a set of program instructions for a terminal device, the terminal device being capable of communicating over a network with:

a first printer in which a first cartridge is mountable, the first printer including a first memory storing first-cartridge status information, the first-cartridge status information being related to a usage status of the first cartridge currently mounted in the first printer; and a second printer different from the first printer, the second printer including a second memory, the terminal device comprising a controller, the set of program instructions, when executed by the controller, causing the terminal device to perform:

transmitting a first request to the first printer, the first request requesting the first printer to transmit the first-cartridge status information to the terminal device;

in response to transmitting the first request to the first printer, receiving the first-cartridge status information from the first printer over the network; and     in response to a specific condition being satisfied, transmitting the received first-cartridge status information to the second printer, the specific condition including a condition that the terminal device receives the first-cartridge status information from the first printer, wherein the first-cartridge status information transmitted to the second printer is stored in the second memory of the second printer, and wherein, after the first cartridge is removed from the first printer and mounted in the second printer, the first-cartridge status information stored in the second memory is used by the second printer.

\* \* \* \* \*